INVENTOR.
James W. Hardy
Roy F. LoPresti
BY
Murray A. Gleeson
ATTORNEY

United States Patent Office 2,983,363
Patented May 9, 1961

2,983,363

FLEXIBLE STRAND SIDEFRAME CONVEYOR AND CONTROLLED FLEXIBLE TROUGHING IDLER ASSEMBLY THEREFOR

James W. Hardy and Roy F. Lo Presti, Chicago, Ill., assignors to Goodman Manufacturing Company, Chicago, Ill., a corporation of Illinois Filed July 29, 1958, Ser. No. 751,699

13 Claims. (Cl. 198—192)

The present invention relates to flexible strand sideframe conveyors and more particularly to an improved connecting-securing means for positioning the troughing assemblies of such conveyors relative to the flexible sideframe strand means thereof in order to acquire an effective control of and to enable an increase in the flexing movement and troughing effect of the strand means and troughing assemblies of the conveyor.

It is the primary object of the present invention to provide a flexible troughing assembly of a flexible strand sideframe conveyor with an improved connecting-securing means for positioning the troughing assembly relative to the flexible sideframe strand means of such conveyor with the flexibility of the troughing assembly and strand means being controlled through the connecting-securing means.

It is another object of the present invention to provide a troughing assembly of a flexible strand sideframe conveyor with an improved connecting-securing means for positioning the troughing assembly relative to the flexible sideframe strand means of such conveyor with the improved connecting-securing means controlling, in accordance with a given predetermined ratio, the flexible movement of both the troughing assembly and the strand means, under varying load conditions, in order to increase the troughing effect of the troughing assembly and to enable deflection of the strand means generally laterally outwardly relative to the conveyor course.

It is an additional object of the present invention to provide an improved connecting-securing means for connecting the end portions of a troughing assembly of a flexible strand sideframe conveyor to the flexible sideframe strand means thereof so that increased downward deflection of the troughing assembly, with increased conveyor loads, causes the flexible sideframe strand means of the conveyor to deflect transversely outwardly relative to the conveyor course to provide a means for preventing possible interference between the flexible sideframe strand means and the moving endless belt of the conveyor.

It is a still further object of the present invention to provide an improved connecting-securing means for positioning the end portions of a flexible troughing assembly of a flexible sideframe conveyor relative to the flexible strand sideframe means thereof wherein at least the end portions of the flexible troughing assembly are disposed in a generally horizontal plane that is vertically spaced above and substantially parallel to a second generally horizontal plane that is substantially common to the flexible strand sideframe means of the conveyor with the improved connecting-securing means enabling the troughing assembly to retain the full flexibility thereof when the end portions are so positioned.

In order to acquire the desired objects, as stated above, and to overcome certain objectionable features now present in prior art flexible strand sideframe conveyors, the present invention provides an improved connecting-securing means which is carried by an end portion of a flexible troughing assembly for positioning the flexible troughing assembly relative to the flexible sideframe strand means. The connecting-securing means includes an elongated lever member or arm that is pivotally connected at one end portion thereof to the strand means and extends generally transversely therefrom substantially longitudinally therealong in spaced relationship thereto with the other end portion of the elongated lever member resting freely on the flexible sideframe strand means in longitudinally spaced relationship downstream to the pivotal connection at the one end portion thereof. The flexible troughing assembly extends generally transversely of the conveyor course and is pivotally connected to an intermediate portion of the elongated lever member at a predetermined point thereon that is spaced downstream from the pivotal connection of the elongated lever member to the flexible sideframe strand means. Also, a relatively rigid spreader means extends generally transversely of the conveyor course in substantially parallel relationship upstream to the troughing assembly. The spreader means is pivotally connected to the elongated lever member at a predetermined point thereon which is longitudinally spaced upstream relative to the pivotal connection of the flexible troughing assembly to the lever member and longitudinally spaced downstream relative to the pivotal connection of the lever member to the flexible strand means. By varying the longitudinal spacing between the pivotal connections of the flexible troughing assembly and spreader means to the lever member and the longitudinal spacing between the pivotal connections of the lever member to the spreader and strand means, in accordance with a desired predetermined ratio, it is possible to definitely control and vary the effective flexibility of the troughing assembly and strand means.

Other objects and important features of the invention will be apparent from a study of the specification following taken with the drawing, which together show and describe a preferred embodiment of the invention and what is now considered to be the best mode of practicing the principles thereof. Other embodiments may be suggested to those having the benefit of the teaching herein, and such other embodiments are intended to be reserved especially as they fall within the scope and the spirit of the appended claims.

Figure 1:
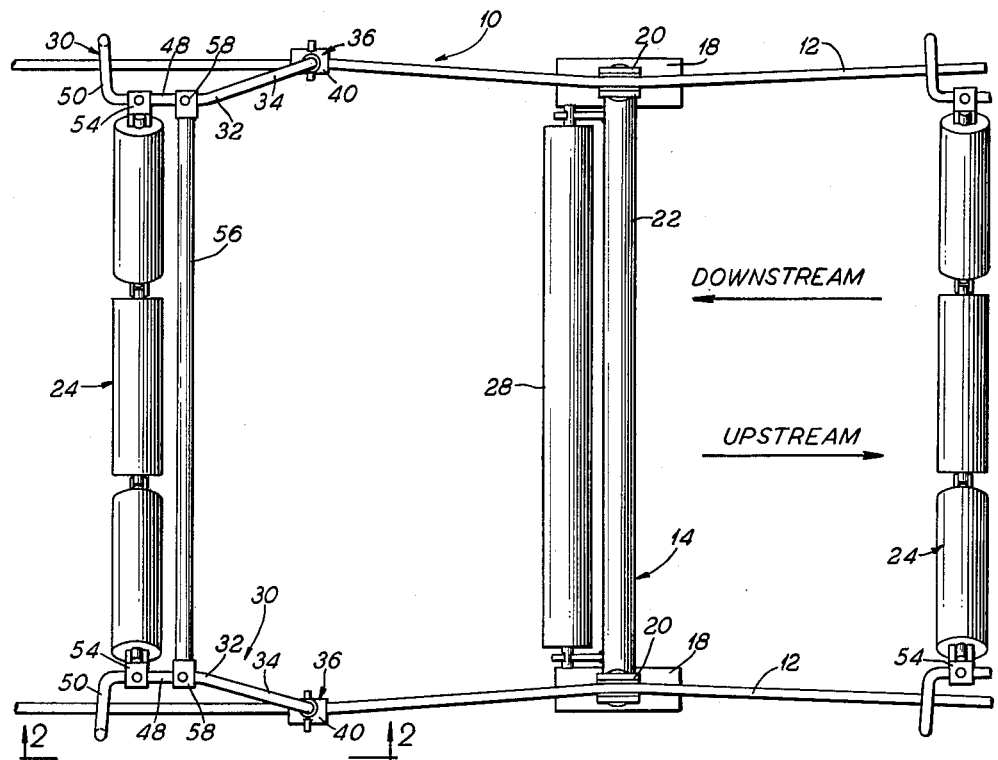
Fig. 1 is a plan view of a portion of a flexible strand sideframe conveyor, with the conveying belt removed, showing a preferred form of the present invention.
Figure 2:
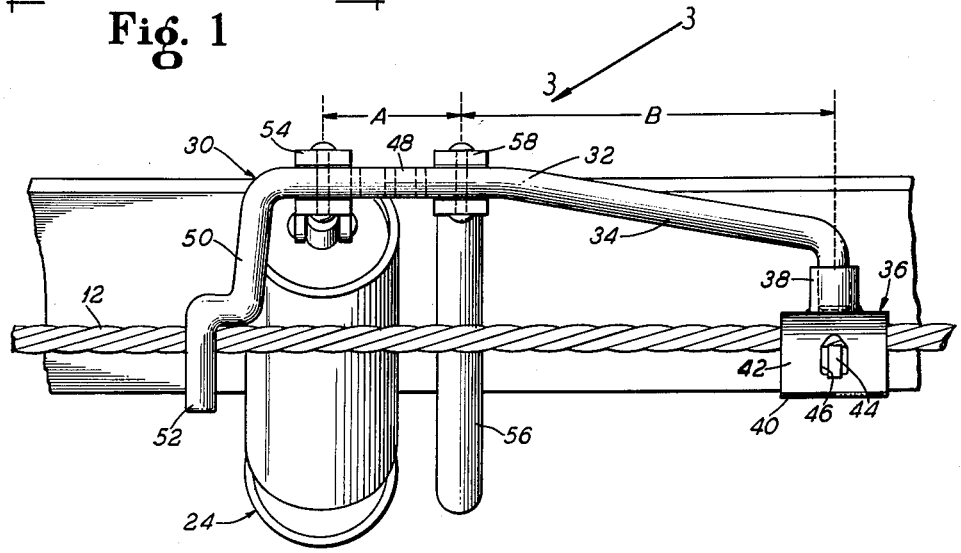
Fig. 2 is an enlarged fragmentary side elevational view taken along the line 2—2 of Fig. 1.
Figure 3:
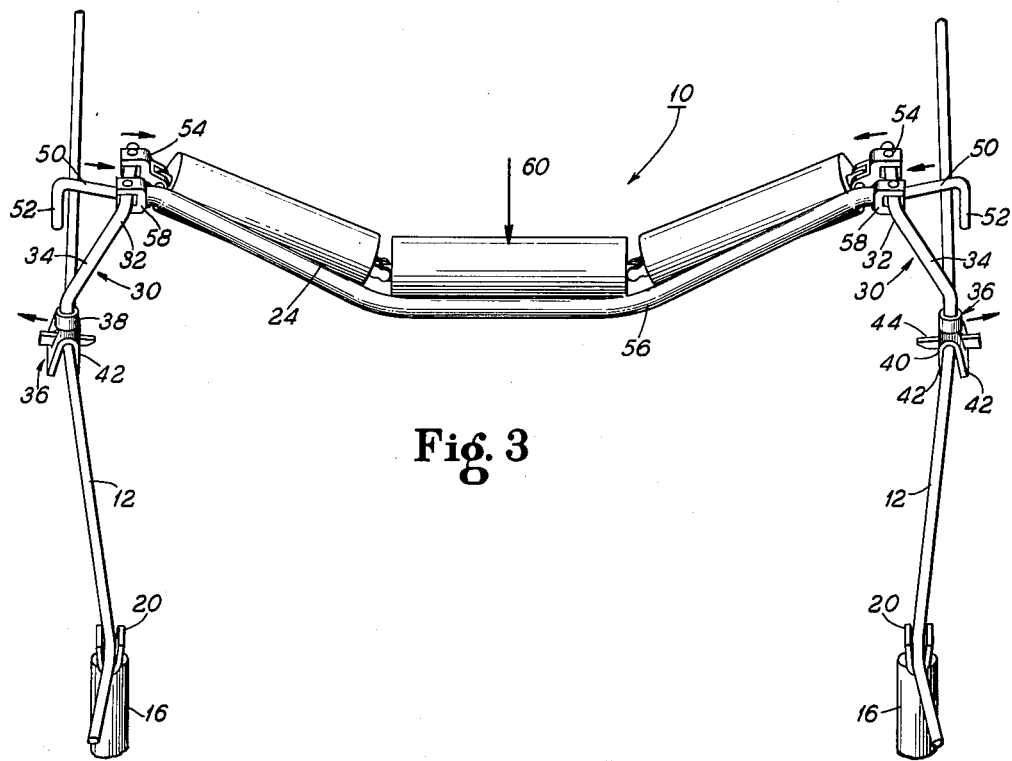
Figure 4:
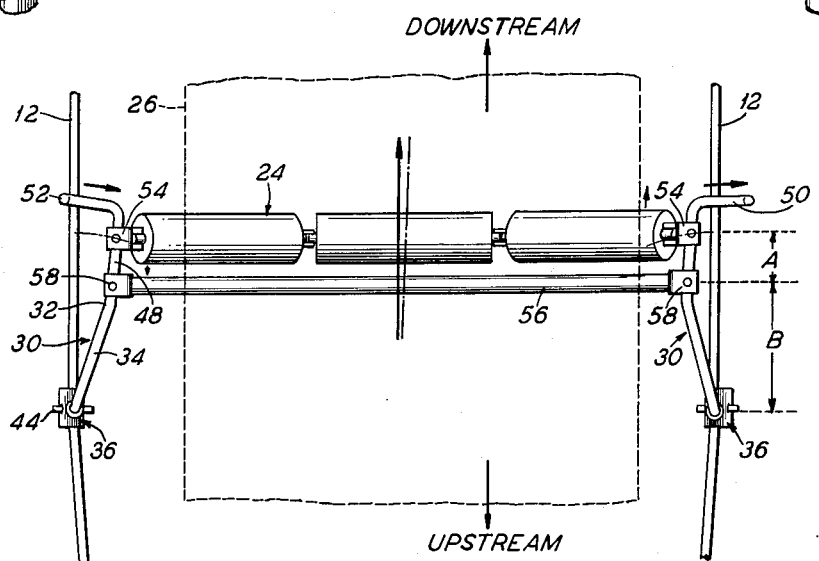

Fig. 3 is a perspective view with parts removed of the flexible sideframe strands and flexible troughing assembly of Fig. 1 taken in the direction of the arrow 3—3 of Fig. 2 for the purpose of illustrating the outward deflection of the strands under a load applied downwardly to the troughing assembly; and Fig. 4 is a plan view of a portion of the conveyor, as shown in Fig. 1, with a portion of the conveying reach of the conveying belt superimposed in broken lines to illustrate the automatic self-training action of the troughing assembly.

Referring now to Figs. 1 and 3 of the drawing wherein there is illustrated a flexible strand sideframe conveyor 10 which includes a pair of transversely spaced, generally parallel flexible sideframe strand means 12—12 which are trained along a given course and so supported at longitudinally spaced locations thereon by a plurality of supporting structures or stands 14, only one of which is illustrated.

The supporting structure 14 comprises a pair of generally vertically extending upright support members 16—16 which are transversely spaced relative to the conveyor course, a ground-engaging base member 18 secured to the lower end portion of each one of the support members 16, as by welding, a cradle element 20 secured, as by welding, to the upper end portion of each one of the support members 16 for engaging the respective strand means 12 at the supported location thereon and a relatively rigid spacer member 22 extending generally transversely relative to the conveyor course and secured to each of the support members 16 to maintain the support members, cradle elements 20 and the associated strand means 12 trained along the desired course.

A plurality of flexible troughing roller assemblies 24 extend generally transversely relative to the conveyor course between the spaced strand means 12—12 and are each supported thereby at locations thereon which are longitudinally spaced from the locations where the strand means 12—12 are supported by the cradle elements 20 of the supporting structures 14.

The flexible troughing assemblies 24 and the flexible strand means 12—12 flexibly support a conveying reach 26 of an endless conveyor belt for orbital longitudinal movement along the conveyor course in a downstream direction, as indicated by the arrows in Fig.s 1 and 3, with the return reach, not illustrated, of such conveyor belt being relatively more rigidly supported by idler structures 28 which extend generally transversely relative to the conveyor course and which are further independently and separately supported, by suitable means, in longitudinally spaced relationship to the troughing assemblies 24, adajcent the lower end portion of the supporting structure 14. This arrangement of structure provides a vertically spaced relative relationship between the flexible supporting structure (strand means 12—12, troughing assemblies 24) for the conveying reach 26 and the relatively rigid idler structures 28 for the return reach of the conveyor belt.

In order to effectively provide a substantially fully flexible troughing assembly 24 having the end portions thereof disposed in a substantially horizontal plane that is upwardly spaced from a substantially horizontal plane that is common to the strand means 12—12 and to effectively control the flexing of the strand means 12—12 and the troughing assemblies 24 under varying load conditions and to further enable deflection of the strand means 12—12 generally transversely outwardly relative to the conveyor course, there is provided a connecting-securing means 30 for connecting each of the end portions of the troughing assemblies 24 to the associated adjacent strand means 12.

Each of the connecting-securing means 30 comprise an elongated lever member 32 which includes an upstream leg portion 34 having a clamping pivot means 36 pivotally securing the upstream end portion of the lever member 32 to the adjacent flexible strand means 12 at locations thereon which are longitudinally spaced from the locations where the strand means 12 is supported by the supporting stands 14. The clamping pivot means 36 includes a substantially cylindrical generally upwardly opening socket member 38 having the upstream end portion of the lever member 32 pivotally mounted therein for pivotal swinging movement thereof in a substantially horizontal plane relative to the conveyor course. The socket member 38 is secured to a generally U-shaped bracket element 40 having spaced arm portions 42 which engage the respective strand means 12 and the clamping pivot means 36 is securely clamped thereto by a wedge means 44 passing through aligned openings 46 in the arm portions 42.

The upstream leg portion 34 of each lever member 32 extends generally upwardly, substantially inwardly and longitudinally in a downstream direction relative to the conveyor course from the respective clamping pivot means 36 and terminates in an intermediate portion 48 which is disposed substantially above and transversely inwardly of the adjacent portion of the strand means 12 and extends longitudinally in a downstream direction therealong in substantially parallel relation thereto.

The intermediate portion 48 of each lever member 32 terminates in a downstream leg portion 50 which extends generally transversely and substantially outwardly relative to the conveyor course above and terminates beyond the adjacent portion of the strand means 12 in a generally downwardly projecting stop portion 52 which is disposed transversely outwardly of that portion of the strand means 12 which is adjacent thereto.

The downstream leg portion 50 of each lever member 32 is longitudinally spaced downstream from the respective clamping pivot means 36 and is slidably supported by the respective strand means 12 for transverse movement relative to the conveyor course as the leg portion 50 is pivotally swung in an arc about the respective clamping pivot means 36 with the stop portion 52 preventing the downstream leg portion 50 from coming completely off the strand means 12.

A pivotal connecting means 54 carried by each end portion of the troughing assembly 24 pivotally connects the troughing assembly to the intermediate portion 48 of the respective lever member 32 at a predetermined location thereon which is longitudinally spaced in a downstream direction from the clamping pivot means 36 with the troughing assembly 24 extending generally transversely of the conveyor course.

A generally upwardly concave or longitudinally downwardly bowed elongated spreader member 56, such as a tie rod, having pivotal connecting means 58 adjacent each end portion thereof is pivotally connected to the intermediate portion 48 of the respective lever member 32 at a predetermined location thereon which is intermediate the predetermined location at which the troughing assembly 24 is pivotally connected to the lever member 32 and the clamping pivot means 36. The spreader member 56 extends generally transversely of the conveyor 10 and is disposed in substantially parallel relationship to the respective troughing assembly 24 and is spaced in an upstream direction therefrom.

As a load 60 is applied generally vertically downwardly to the troughing assembly 24, the troughing angle and contour of the troughing assembly 24 is increased causing the pivotal connecting means 54 to exert a generally transversely inward force or pull, in the direction of the arrows in Fig. 3, on the intermediate portions 48 of the lever members 32 at the predetermined locations thereon which are longitudinally spaced, in a downstream direction, from the clamping pivot means 36. This inward pull causes the lever members 32 to pivotally swing generally about the clamping pivot means 36 and the downstream leg portions 50 of the lever members 32 slide transversely inwardly across the strand means 12, as indicated by the arms in Fig. 3. Since the spreader member 56 is relatively rigid, the upstream leg portions 34 and the clamping pivot means 36 are urged in a generally transversely outward direction against the strand means 12 to cause the strand means to deflect generally transversely outwardly relative to the conveyor 10 at the locations thereon where the clamping pivot means 36 are secured.

As shown in Figure 4, the predetermined point, at which the pivotal connecting means 54 articulately connects the troughing assembly 24 to the lever member 32, is longitudinally spaced distance A in a downstream direction from the predetermined point at which the pivotal connecting means 58 articulately connects the spreader member 56 to the lever member 32. It can also be seen that the predetermined point of connection for the pivotal connecting means 58 is also longitudinally spaced a distance B in a downstream direction from the location where the clamping pivot means 36 is articulately connected to the strand means 12. Hence, by varying the ratio of the distances A/B, a control is acquired over the flexibility of the troughing assembly 24 and strand means 12 that has not been heretofore obtainable in the prior art flexible strand sideframe conveyors.

The connecting-securing means 30 of the present invention provides an interconnected lever supporting system for connecting the troughing assembly 24 to the strand means 12 so that the degree of troughing angle and deflection of the strand means 12 may be readily controlled and changed by varying the lever leg ratio about the pivotal connecting means 58 which acts as a fulcrum point for the elongated lever member 32 with the longitudinal downstream distance A from the fulcrum pivot defined by the pivotal connecting means 58 to the pivotal connecting means 54 establishing a predetermined amount of transversely inward deflection of the end portions of the troughing assembly 24 to control the effective depth of the troughing angle, the longitudinal upstream distance B from the aforementioned fulcrum point to the clamping pivot means 36 establishing and controlling a predetermined amount of transversely outward deflection of the strand means 12. It is to be understood that the above described ratio may be changed and varied in order to obtain the desired control of the flexibility of the strand means 12 and troughing assemblies 24.

The present connecting-securing means 30 also enables the flexible troughing assembly 24 to substantially retain all of its flexibility while having at least the end portions therof positioned in a generally horizontally disposed, vertically upwardly spaced plane that is substantially parallel to a second plane which is substantially common to the strand means 12—12 of the conveyor 10 since the pivotal connecting means 54 connects the troughing assembly 24 to the respective intermediate portions 48 of the lever members 32 and, as disclosed and described above, the intermediate portions 48 are disposed vertically above the adjacent portions of the strand means 12, note Fig. 2, and will thus position the end portions of the troughing assembly 24 above the level of the strand members 12.

Another desired result acquired by the use of the aforementioned and described connecting-securing means 30, is the automatic conveyor belt self-training feature, as shown in Fig. 4. The opposed, longitudinally extending, elongated lever members 32 are pivotally connected to the strand means 12 by the clamping pivot means 36 in longitudinally spaced relationship in an upstream direction to both of the pivotal connecting means 54 and 58. Movement of the conveying reach 26 of the endless belt generally transversely of the conveyor 10 to an offcenter location, as illustrated by the dotted lines in Fig. 4, will cause the pivotal connecting means 54 to swing through arcs about the respective clamping pivot means 36, illustrated in dot-dash lines, with the pivot connecting means 54 that is opposite the direction of offcenter movement swinging in a generally transversely inward upstream direction and the other pivot connecting means 54 swinging in a generally transversely outward downstream direction. The pivotal connecting means 54 are both positioned transversely inwardly relative to the adjacent strand means 12 and the movement of the offcenter conveying reach 26, to the right as shown in Fig. 4, will cause the entire troughing assembly 24 in turn to move in substantially the same general direction, which in turn will cause both of the pivotal connecting means 54 to follow the respective arcs and thereby cause the respective end portions of the troughing assembly 24 to follow the respective pivotal connecting means with the right hand end portion being downstream and the left hand end portion being upstream, as shown in Fig. 4, with the troughing assembly 24 canted to cause the conveying reach 26 to be urged back to the left into correct longitudinal position and retrained relationship, as indicated by the arrows in Fig. 4.

While the invention has been described in terms of an embodiment which it has assumed in practice, the scope of the invention should not be deemed to be limited to the precise embodiment herein shown, such other embodiments being intended to be reserved especially as they fall within the scope of the claims here appended.

We claim as our invention:

1. In a flexible strand sideframe conveyor having a pair of flexible strands trained along a given course, an elongated flexible troughing assembly spanning said strands at positions thereon where said strands are flexible, said troughing assembly having adjacent each end portion thereof connecting-securing means for positioning the troughing assembly relative to the strands, each of said connecting-securing means including an elongated lever member having an intermediate portion and leg portions extending therefrom, clamping pivot means pivotally connecting each lever member by one leg portion to the associated strand for pivotal movement of the lever member in a substantially horizontal plane generally transversely of the given course, each of said lever members extending from the respective clamping pivot means with the one leg portion being disposed substantially longitudinally along the given course and the intermediate portion thereof being in upwardly spaced generally parallel relationship to the adjacent portion of the associated strand, said other leg portion of each lever member extending from the respective intermediate portion thereof generally transversely outwardly of the given course and slidably engaging the associated strand in spaced relationship to the respective clamping pivot means and terminating in stop means effective to limit the pivotal movement of the respective lever member, said troughing assembly being pivotally connected to the intermediate portion of each lever member, and spreader means pivotally connected to each of the lever members intermediate the pivotal connection of the troughing assembly thereto and the clamping pivot means thereon.

2. In a flexible strand sideframe conveyor including a pair of flexible strand means trained in generally parallel relationship to each other along a given course, supporting structure for supporting said strand means at a location thereon effective to maintain a predetermined spacing between the strand means at the supported location, an elongated flexible troughing assembly spanning the spacing between the strand means and adapted to support a conveying reach of a conveyor belt, connecting means adjacent each end portion of the troughing assembly for positioning said troughing assembly relative to each of the strand means at a position thereon which is longitudinally spaced along the course from the said supported location, each of said connecting means including an elongated lever member having an intermediate portion and leg portion extending generally in opposite directions therefrom, coupling pivot means for pivotally connecting the lever member by one leg portion to the associated strand means adjacent said position, each of said lever members extending from the respective coupling pivot means with the intermediate portion thereof disposed in gerally spaced relationship to the associated strand means and terminating with the other leg portion in sliding engagement with the associated strand means in longitudinally spaced relationship to the respective coupling pivot means, said troughing assembly being pivotally secured to the intermediate portion of each lever member, and spreader means pivotally secured to the intermediate portion of each lever member at a position thereon which is intermediate the pivotal connections of the respective lever member to the troughing assembly and to the associated strand means.

3. The structure as set forth in claim 2 wherein said intermediate portion of each lever member is disposed generally upwardly and substantially parallel to the adjacent portion of the associated strand means, whereby substantially the full flexibility of the troughing assembly is maintained with the adjacent portions of the associated strand means being disposed below the respective end portions of the troughing assembly.

4. An interconnected lever system for supporting a flexible troughing assembly relative to a flexible sideframe strand means of a flexible sideframe conveyor, said system including a pair of spaced elongated lever members, each of said lever members having pivot means adjacent one end portion thereof adapted to mount the lever member to a flexible strand means for pivotal movement of the lever member relative thereto with the other end portion of the lever member being adapted to slidably engage such flexible strand means in spaced relationship to the pivot means, said other end portion of each lever member defining stop means for limiting the pivotal movement of the respective lever member, and elongated spreader means having the end portions thereof pivotally connected to an intermediate portion of each lever member.

5. In a belt conveyor, a flexible support for a conveying reach of an orbitally movable belt, said support comprising a pair of flexible strands trained along generally parallel courses, strand support means effectively maintaining a predetermined gage between said strands at said support means, a troughing assembly spanning portions of said strands at a position thereon where said strands are flexible, a pair of levers, each of said levers being articulately connected adjacent one of its end portions to an associated strand at said position, the opposite end portion of each lever bearing on the associated strand and being slidable transversely thereacross, a spreader extending between said strands and articulately interconnected to intermediate portions of said levers, and elongated troughing means being flexible transversely of its length and having each end portion articulately connected to a respective lever at a position thereon which is to a side of said spreader remote from the articulate connection of the levers to the strands, whereby deflection of said troughing means to deepen the troughing contour thereof urges the said opposite end portions of the levers inwardly toward one another and slidably across said strands while thrusting the one end portions of the levers outward to correspondingly outwardly deflect said flexible strand portions.

6. A troughing assembly comprising a pair of elongated lever members, each of said lever members being adapted to be secured adjacent one end portion thereof to a flexible strand with the other end portion being in sliding engagement therewith, flexible troughing means extending between the lever members, pivotal connecting means pivotally connecting the troughing means to an intermediate portion of each lever member, a spreader member extending between the lever members, and pivotal connecting means pivotally connecting the spreader member to each of the lever members at portions thereof which are intermediate the first named pivotal connecting means and the one end portion of the respective lever member.

7. A troughing assembly comprising a troughing means, a pair of elongated lever members, said troughing means being pivotally connected to each of the lever members and extending therebetween, pivot means adjacent an end portion of each lever member adapted to pivotally mount the troughing assembly to a flexible strand of a flexible sideframe conveyor, and spreader means pivotally connected to each of the lever members at positions thereon which are intermediate the pivot means and the pivotal connection of the troughing means thereto.

8. A troughing idler assembly for use in a belt conveyor of the type wherein a pair of flexible strands are trained in generally parallel relationship along a conveying course, said troughing idler assembly including in combination, a troughing idler assembly having a plurality of belt supporting rollers constructed and arranged to flex with respect to one another in a generally vertical plane whereby the ends of the roller assembly may move toward and away from one another, and a pair of lever systems for connecting the roller assembly to the flexible strands in such a manner as to induce transversely outward movement of the strands with respect to the conveying course in response to load on the roller assembly, each of said lever systems including an elongated lever and means for pivotally connecting the lever at one of its end portions to a flexible strand to thereby enable the lever to swing in a generally horizontal plane, the other end of the lever being constructed and arranged to slide across the flexible strand in a generally transverse direction as the lever swings about the pivotal connecting means, means for articulately connecting one end of the roller assembly to each lever, and an elongated substantially rigid fulcrum member pivotally connected adjacent each of its end portions to a lever member, the points of connection of the end portions of the fulcrum member to the levers being located between the pivotal connections of the one end portions of the lever member to the strands and the points of connection of the troughing roller assembly to the lever members.

9. The troughing idler assembly of claim 8 further characterized by and including stop means carried by the lever members constructed and arranged to limit the transversely inward movement of the other ends of the levers.

10. The troughing idler assembly of claim 8 further characterized in that the portion of the lever member to which the troughing roller assembly is connected lies a substantial distance above the flexible strands.

11. The troughing idler assembly of claim 8 further characterized by and including means for varying the relative spacing between the troughing roller assembly, fulcrum member, and pivoted connections of the levers to the strands to theerby control the depth of trough and outward deflection of the flexible strands for any given load.

12. Means for connecting a roller assembly to a support structure, such as a sdieframe, of a flexible belt conveyor which forces the sideframe outwardly away from the belt in response to load on the belt to thereby reduce possible interference between the belt and support structure, said means including, in combination, a pair of substantially rigid lever members each of said lever members having a portion thereof disposed in a generally horizontal plane, means constructed and arranged to pivotally connect a roller assembly to the generally horizontally disposed portions of the lever members, means constructed and arranged to connect the lever members to the support structure at a location upstream, as measured with respect to the direction of belt travel, from the roller assembly connections to thereby enable the generally horizontally disposed portions of the lever members to swing in a generally horizontal plane, and a substantially rigid fulcrum member extending between and pivotally connected to the lever members at locations intermediate the connections of the lever members to the sideframes and the lever members to the roller assembly whereby inward movement of the lever members toward one another in response to troughing movement of the rollers induces an outward movement of the flexible sideframes at the locations at which the lever members are connected to the sideframes.

13. The roller assembly connecting means of claim 12 further characterized in that the substantially rigid fulcrum member is connected to the generally horizontally disposed portions of the lever members.

References Cited in the file of this patent

UNITED STATES PATENTS

| 909,833 | Vrooman | Jan. 12, 1909 |
| 2,451,394 | Klein | Oct. 12, 1948 |
| 2,805,763 | McCallum | Sept. 10, 1957 |